(12) United States Patent
Rupasinghe et al.

(10) Patent No.: US 12,199,723 B2
(45) Date of Patent: Jan. 14, 2025

(54) CHANNEL STATE INFORMATION (CSI) OMISSION PROCEDURE FOR REL. 16 TYPE II CSI

(71) Applicant: NTT DOCOMO, INC., Tokyo (JP)

(72) Inventors: Nadisanka Rupasinghe, Tokyo (JP); Shohei Yoshioka, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 326 days.

(21) Appl. No.: 17/634,808

(22) PCT Filed: Aug. 12, 2020

(86) PCT No.: PCT/US2020/045944
§ 371 (c)(1),
(2) Date: Feb. 11, 2022

(87) PCT Pub. No.: WO2021/030442
PCT Pub. Date: Feb. 18, 2021

(65) Prior Publication Data
US 2022/0360312 A1 Nov. 10, 2022

Related U.S. Application Data

(60) Provisional application No. 62/885,570, filed on Aug. 12, 2019.

(51) Int. Cl.
*H04B 7/06* (2006.01)
*H04L 5/00* (2006.01)

(52) U.S. Cl.
CPC ......... *H04B 7/0658* (2013.01); *H04B 7/0626* (2013.01); *H04B 7/0639* (2013.01); *H04B 7/065* (2013.01); *H04L 5/0053* (2013.01)

(58) Field of Classification Search
CPC .. H04B 7/0658; H04B 7/0626; H04B 7/0639; H04B 7/065; H04B 7/048; H04B 7/0634;
(Continued)

(56) References Cited

U.S. PATENT DOCUMENTS

2019/0109626 A1 4/2019 Park et al.
2019/0306018 A1* 10/2019 Steverson ........... H04L 41/0806
(Continued)

FOREIGN PATENT DOCUMENTS

WO 2020-225642 A1 11/2020

OTHER PUBLICATIONS

Office Action issued in Japanese Application No. 2022-508862 dated Feb. 14, 2023 (9 pages).
(Continued)

*Primary Examiner* — Dady Chery
(74) *Attorney, Agent, or Firm* — Osha Bergman Watanabe & Burton LLP (57) ABSTRACT

A user equipment (UE) in communication with a base station (BS) is disclosed that includes a receiver that receives Channel State Information (CSI)-Reference Signals (RSs) from the BS, a processor that generates CSI based on the CSI-RS and performs CSI omission, and a transmitter that transmits, to the BS, CSI reports including the CSI where one or more linear combination (LC) coefficients are omitted based on the CSI omission. Further, in the CSI omission, the processor prioritizes LC coefficients based on a predetermined priority rule and the processor also determines the omitted one or more LC coefficients based on the prioritized LC coefficients. In other aspects, a method for a UE and a wireless communication system are disclosed.

9 Claims, 8 Drawing Sheets

(58) Field of Classification Search
CPC ... H04L 5/0053; H04L 5/0007; H04L 5/0023; H04L 5/005; H04L 25/022; H04L 5/0055; H04L 5/0057; H04L 5/0064
See application file for complete search history.

(56) References Cited

U.S. PATENT DOCUMENTS

| | | | |
|---|---|---|---|
| 2020/0295812 A1* | 9/2020 | Rahman | H04B 7/0626 |
| 2021/0083743 A1* | 3/2021 | Faxér | H04L 5/0057 |
| 2022/0239360 A1* | 7/2022 | Faxér | H04B 7/0478 |

OTHER PUBLICATIONS

Office Action issued in Chinese Application No. 202080070485.5, dated Jun. 29, 2023 (23 pages).
3GPP TSG RAN WG1 Meeting RAN1#97; R1-1907076 "On CSI omission procedure" Ericsson; Reno, US; May 13-17, 2019 (6 pages).
3GPP TS 38.214 V15.3.0 "3rd Generation Partnership Project; Technical Specification Group Radio Access Network; NR; Physical layer procedures for data (Release 15)" Sep. 2018 (96 pages).
International Search Report issued in International Application No. PCT/US2020/045944, mailed Nov. 2, 2020 (4 pages).
Written Opinion issued in International Application No. PCT/US2020/045944; Dated Nov. 2, 2020 (6 pages).

* cited by examiner

CHANNEL STATE INFORMATION (CSI) OMISSION PROCEDURE FOR REL. 16 TYPE II CSI

TECHNICAL FIELD

One or more embodiments disclosed herein relate to a method of Channel State Information (CSI) omission for Rel.16 Type II CSI in a wireless communication system.

BACKGROUND ART

Type II CSI feedback in 5G (fifth generation) NR (New Radio) Release 15 (Rel. 15) supports only rank 1 and 2. Further, feedback overheads associated with Rel. 15 Type II CSI are identified to be high.

In view of the above, in Rel. 16, it is identified to propose overhead reduction schemes for Type II CSI feedback and higher rank extension of Type II CSI feedback.

For overhead reduction, it is required to consider frequency domain (FD) compression technologies.

For higher rank extension, it is required to extend Type II CSI to rank 3 and rank 4, in addition to rank 1 and rank 2.

These new additions to Type II CSI in Rel. 16 necessitate revising existing CSI omission procedure to fit CSI in to allocated Physical Uplink Control Channel (PUCCH) and Physical Uplink Shared Channel (PUSCH) resources.

However, Type II CSI in Rel. 16 has not defined Wideband (WB) and Sub-band (SB) based CSI reports.

CITATION LIST

Non-Patent Reference

[Non-Patent Reference 1] 3GPP TS 38.214 V15.3.0

SUMMARY OF INVENTION

One or more embodiments relate to a user equipment (UE) in communication with a base station (BS), the UE comprising: a receiver that receives Channel State Information (CSI)-Reference Signals (RSs) from the BS; a processor that generates CSI based on the CSI-RSs and performs CSI omission; and a transmitter that transmits, to the BS, CSI reports including the CSI where one or more linear combination (LC) coefficients are omitted based on the CSI omission, wherein in the CSI omission, the processor prioritizes LC coefficients based on a predetermined priority rule, and wherein the processor determines the omitted one or more LC coefficients based on the prioritized LC coefficients.

One or more embodiments relate to a method for a user equipment (UE) that is in communication with a base station (BS), the method comprising: receiving Channel State Information (CSI)-Reference Signals (RSs) from the BS; generating CSI based on the CSI-RSs and performs CSI omission; and transmitting, to the BS, CSI reports including the CSI where one or more linear combination (LC) coefficients are omitted based on the CSI omission, wherein in the CSI omission, the UE prioritizes LC coefficients based on a predetermined priority rule, and wherein the UE determines the omitted one or more LC coefficients based on the prioritized LC coefficients.

One or more embodiments relate to a wireless communication system comprising: a base station (BS); and a user equipment (UE) comprising: a receiver that receives Channel State Information (CSI)-Reference Signals (RSs) from the BS; a processor that generates CSI based on the CSI-RSs and performs CSI omission; and a transmitter that transmits, to the BS, CSI reports including the CSI where one or more linear combination (LC) coefficients are omitted based on the CSI omission, wherein in the CSI omission, the processor prioritizes LC coefficients based on a predetermined priority rule, and wherein the processor determines the omitted one or more LC coefficients based on the prioritized LC coefficients.

Other embodiments and advantages of the present invention will be recognized from the description and figures.

DESCRIPTION OF EMBODIMENTS

Embodiments of the present invention will be described in detail below with reference to the drawings. Like elements in the various figures are denoted by like reference numerals for consistency.

In the following description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
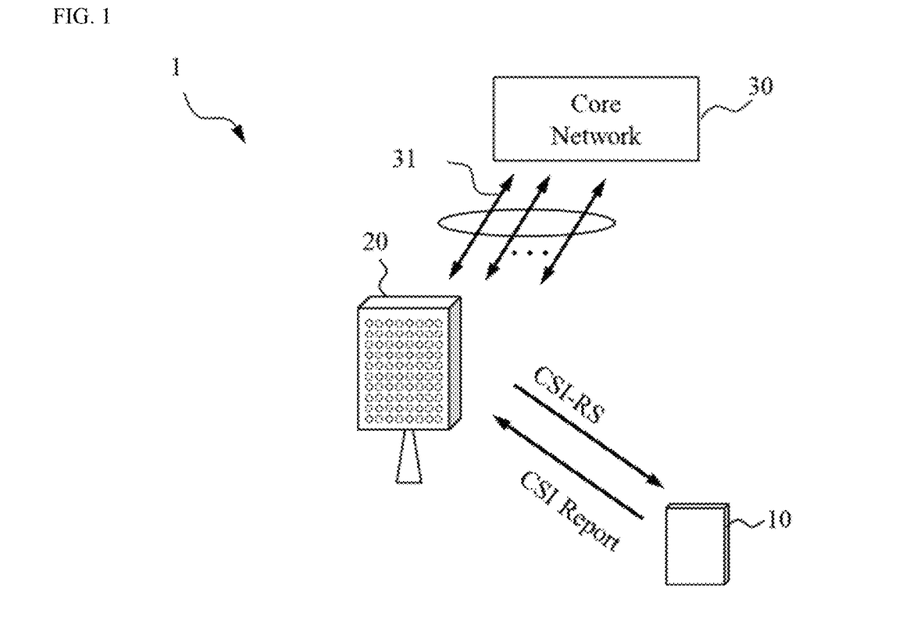
FIG. 1 shows a configuration of a wireless communication system according to one or more embodiments of the present invention.

FIG. 1 is a wireless communications system 1 according to one or more embodiments of the present invention. The wireless communication system 1 includes a user equipment (UE) 10, a base station (BS) 20, and a core network 30. The wireless communication system 1 may be a NR system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may communicate DL and UL signals with the core network 30 through backhaul links 31. The BS 20 may be gNodeB (gNB).

The BS 20 includes antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using Multi Input Multi Output (MIMO) technology. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RANI (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

As shown in FIG. 1, the BS 20 may transmit a CSI-Reference Signal (CSI-RS) to the UE 10. In response, the UE 10 may transmit a CSI report to the BS 20.

The wireless communication system 1 supports Type II CSI feedback. CSI to be reported for Type II CSI feedback may be referred to as Type II CSI. Type II CSI includes CSI Part 1 and CSI Part 2, which may differ based upon respective correspondence to Rel. 15 or Rel. 16 as discussed below. CSI Part 1 of Rel. 15 Type II CSI has a fixed payload size and includes Rank Indicator (RI), Channel Quality Indicator (CQI), and an indication of the number of non-zero WB amplitude coefficients (NNZC) per layer for the Type II CSI. The fields of CSI Part 1 of the RI, the CQI, and the indication of the number of non-zero wideband amplitude coefficients for each layer may be separately encoded. CSI Part 2 of Rel. 15 Type II CSI includes Precoding Matrix Indicator (PMI) that includes WB PMI and SB PMI. In one or more embodiments, CSI Part 2 of Rel. 16 Type II CSI includes spatial domain (SD) and frequency domain (FD) basis indication, bitmaps of each layer, strongest coefficient indicator of each layer, reference amplitude for the weaker polarization $P_{ref}$ and LC coefficients. The size of bitmaps of each layer may be 2LM. "L" indicates a beam number whereas "M" is the number of FD vectors. CSI Part 1 and CSI Part 2 may be separately encoded.

Figure 2:
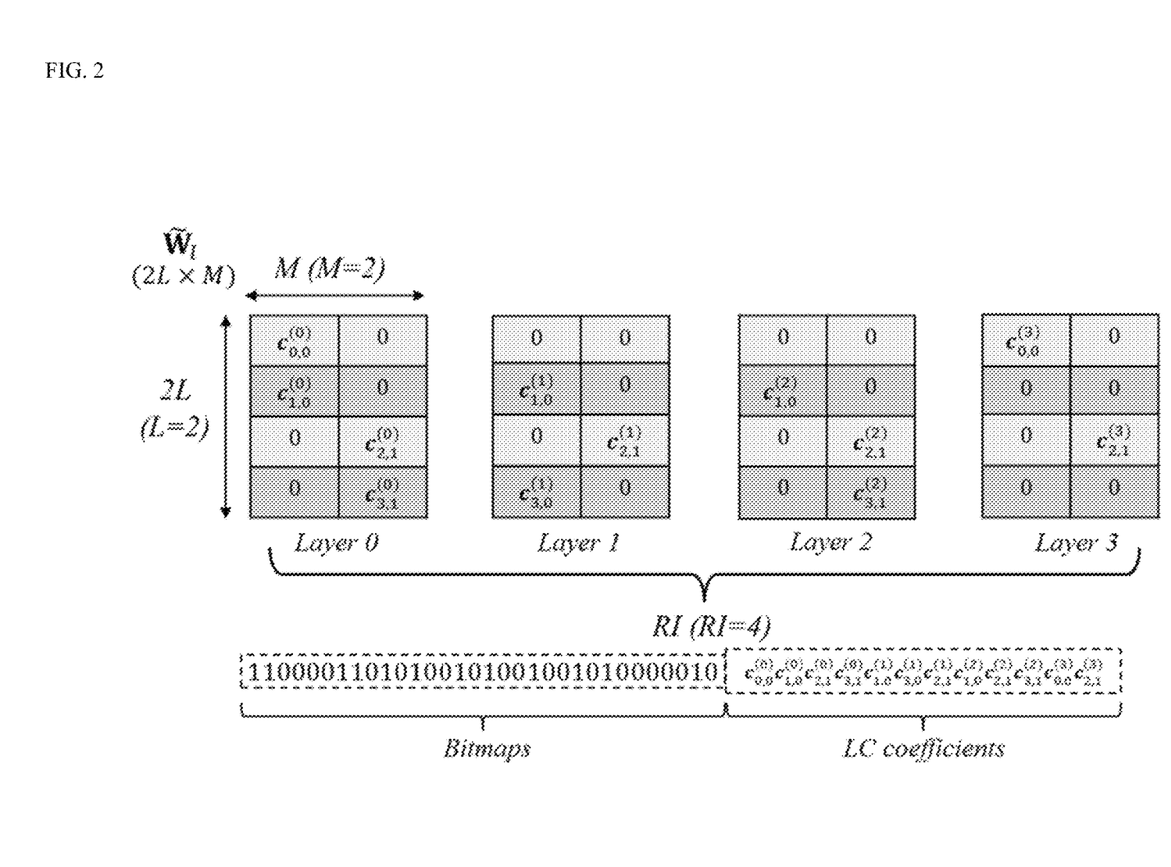
FIG. 2 shows a LC coefficients configuration in CSI Part 2 according to one or more embodiments.

In one or more embodiments, CSI omission may be performed by dropping non-zero coefficients (NZCs) based on CSI omission rules for rate/resource matching when determining PUCCH/PUSCH resources. Assuming L=2, M=2, and RI=4, bitmaps and LC coefficients for CSI Part 2 may be represented as shown in FIG. 2. A bit sequence corresponding to bitmaps may be generated by raw-wise (based on SD-beam index) reading of each layer. In an example of FIG. 2, the bit sequence may be "10100101001001100010010110000100."

FIRST EXAMPLE

According to one or more embodiments, the LC coefficients may be prioritized by the UE 10. For example, the LC coefficients may be prioritized based on each layer index. During CSI omission, there is a higher chance of dropping all LC coefficients belong to a particular layer(s) with the prioritization procedure.

The highest priority of the LC coefficients is the layer index, followed in order by the FD-beam index and the SD-beam index. For example, the LC coefficients are in order of priority or $c_{0,0}^{(0)} c_{1,0}^{(0)} c_{2,1}^{(0)} c_{3,1}^{(0)} c_{1,0}^{(1)} c_{3,0}^{(1)} c_{2,1}^{(1)} c_{1,0}^{(2)} c_{2,1}^{(2)} c_{3,1}^{(2)} c_{0,0}^{(3)} c_{2,1}^{(3)}$ where $c_{0,0}^{(0)}$ has the highest priority, followed in order by $c_{1,0}^{(0)}, c_{2,1}^{(0)}, \ldots, c_{2,1}^{(3)}$.

Figure 3:
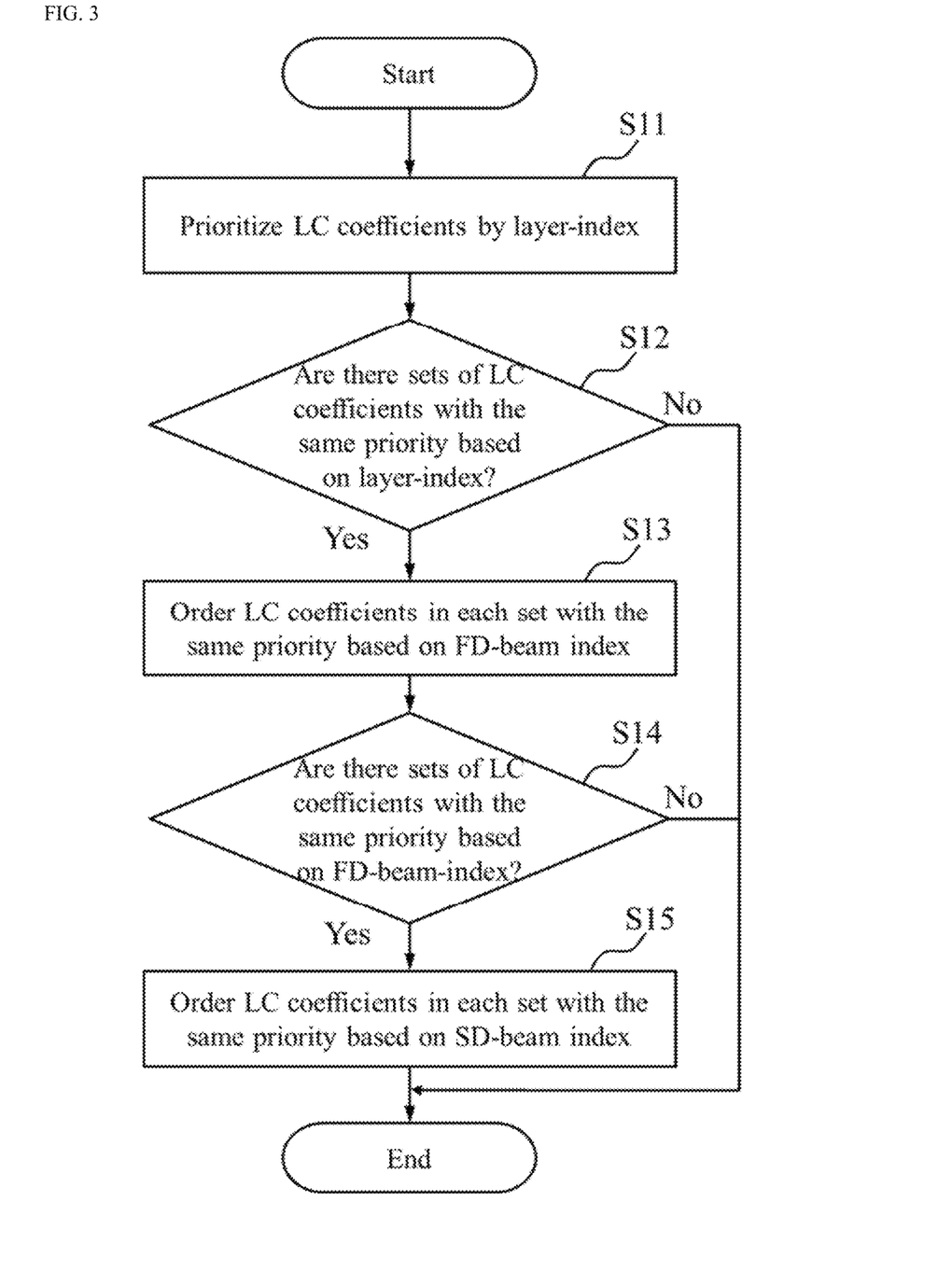
FIG. 3 shows a flowchart of a method of prioritizing LC coefficients according to one or more embodiments.

As shown in FIG. 3, at step S11, the UE 10 may prioritize the LC coefficients by the layer-index. For example, the prioritized LC coefficients are $c_{1,0}^{(0)}, c_{3,1}^{(0)}, c_{0,0}^{(0)}, c_{2,1}^{(0)}$.

At step S12, the UE 10 determines whether there are set of LC coefficients with same priority based on the layer-index.

If no at step S12, that is, each of $c_{1,0}^{(0)}, c_{3,1}^{(0)}, c_{0,0}^{(0)}, c_{2,1}^{(0)}$ has different priority values, the prioritization procedure is completed.

If yes at step S12, that is, each of $c_{1,0}^{(0)}, c_{3,1}^{(0)}, c_{0,0}^{(0)}, c_{2,1}^{(0)}$ has the same priority value, the LC coefficients are ordered based on the FD-beam index at step S13.

At step S14, the UE 10 determines whether there are set of LC coefficients with the same priority value based on the FD-beam index.

If no at step S14, that is, each of $c_{1,0}^{(0)}, c_{3,1}^{(0)}, c_{0,0}^{(0)}, c_{2,1}^{(0)}$ has the different priority values based on the FD-beam index, the prioritization procedure is completed.

If yes at step S14, the LC coefficients are ordered based on the SD-beam index at step S15. For example, each of $c_{1,0}^{(0)}, c_{0,0}^{(0)}$ has the same priority value based on the FD-beam index. Likewise, each of $c_{3,1}^{(0)}, c_{2,1}^{(0)}$ has the same priority value based on the FD-beam index, which is lower than the priority value of $c_{1,0}^{(0)}, c_{0,0}^{(0)}$. When the priority value based on the SD-beam index of $c_{1,0}^{(0)}$ is lower than the priority value of $c_{0,0}^{(0)}$ and the priority value based on the SD-beam index of $c_{3,1}^{(0)}$ is lower than the priority of $c_{2,1}^{(0)}$, the LC coefficients are in order of priority of $c_{0,0}^{(0)} c_{1,0}^{(0)} c_{2,1}^{(0)} c_{3,1}^{(0)}$.

As another example, the LC coefficients may be prioritized so that the highest priority of the LC coefficients is the layer index, followed in order by the SD-beam index and the FD-beam index. For example, the LC coefficients are in order of priority of $c_{0,0}^{(0)} c_{1,0}^{(0)} c_{2,1}^{(0)} c_{3,1}^{(0)} c_{1,0}^{(1)} c_{2,1}^{(1)} c_{3,0}^{(1)} c_{1,0}^{(2)} c_{2,1}^{(2)} c_{3,1}^{(3)} c_{0,0}^{(3)} c_{2,1}^{(3)}$ where $c_{0,0}^{(0)}$ has the highest priority, followed in order by $c_{1,0}^{(0)}, c_{2,1}^{(0)}, \ldots, c_{2,1}^{(3)}$.

According to one or more embodiments, the LC coefficients may be prioritized based on each FD-beam index. This procedure makes sure sustained LC coefficients after CSI omission are distributed across all layers.

According to one or more embodiments, the highest priority of the LC coefficients is the FD-beam index, followed in order by the SD-beam index and the layer index. For example, the LC coefficients are in order of priority of $c_{0,0}^{(0)} c_{0,0}^{(3)} c_{1,0}^{(0)} c_{1,0}^{(1)} c_{1,0}^{(2)} c_{3,0}^{(1)} c_{2,1}^{(0)} c_{2,1}^{(1)} c_{2,1}^{(2)} c_{2,1}^{(3)} c_{3,1}^{(0)} c_{3,1}^{(2)}$ where $c_{0,0}^{(0)}$ has the highest priority, followed in order by $c_{0,0}^{(3)} c_{1,0}^{(0)}, \ldots, c_{3,1}^{(2)}$. In the sequence of the LC coefficients, $c_{0,0}^{(0)} c_{0,0}^{(3)} c_{1,0}^{(0)} c_{1,0}^{(1)} c_{1,0}^{(2)} c_{3,0}^{(1)}$ correspond to FD 0 and $c_{2,1}^{(0)} c_{2,1}^{(1)} c_{2,1}^{(2)} c_{2,1}^{(3)} c_{3,1}^{(0)} c_{3,1}^{(2)}$ correspond to FD 1.

According to one or more embodiments, the highest priority of the LC coefficients is the FD-beam index, followed in order by the layer index and the SD-beam index. For example, the LC coefficients are in order of priority of $c_{0,0}^{(0)} c_{1,0}^{(0)} c_{1,0}^{(1)} c_{3,0}^{(1)} c_{1,0}^{(2)} c_{0,0}^{(3)} c_{2,1}^{(0)} c_{3,1}^{(0)} c_{2,1}^{(1)} c_{2,1}^{(2)} c_{3,1}^{(2)} c_{2,1}^{(3)}$ where $c_{0,0}^{(0)}$ has the highest priority, followed in order by $c_{1,0}^{(0)}, c_{1,0}^{(1)}, \ldots, c_{3,1}^{(2)}$. In the sequence of the LC coefficients, $c_{0,0}^{(0)}c_{1,0}^{(0)}c_{1,0}^{(1)}c_{3,0}^{(1)}c_{1,0}^{(2)}c_{0,0}^{(3)}$ correspond to FD 0 and $c_{2,1}^{(0)}c_{3,1}^{(0)}c_{2,1}^{(1)}c_{2,1}^{(2)}c_{3,1}^{(2)}c_{2,1}^{(3)}$ correspond to FD1.

According to one or more embodiments, the LC coefficients may be prioritized based on each SD-beam index. In one or more embodiments, the prioritization procedure considered for LC coefficient ordering may be defined in the specification (e.g., 3GPP technical specification) and the UE 10 and the BS 20 may recognize and implement the prioritization procedure based on the specification.

According to one or more embodiments, the highest priority of the LC coefficients is the SD-beam index, followed in order by the FD-beam index and the layer index. For example, the LC coefficients are in order of priority of $c_{0,0}^{(0)}c_{0,0}^{(3)}c_{1,0}^{(0)}c_{1,0}^{(1)}c_{1,0}^{(2)}c_{2,1}^{(0)}c_{2,1}^{(1)}c_{2,1}^{(2)}c_{2,1}^{(3)}c_{3,0}^{(1)}c_{3,1}^{(0)}c_{3,1}^{(2)}$ where $c_{0,0}^{(0)}$ has the highest priority, followed in order by $c_{0,0}^{(3)}, c_{1,0}^{(0)}, \ldots, c_{3,1}^{(2)}$. In the sequence of the LC coefficients, $c_{0,0}^{(0)}c_{0,0}^{(3)}$ correspond to SD 0, $c_{1,0}^{(0)}c_{1,0}^{(1)}$ correspond to SD 1, $c_{2,1}^{(0)}c_{2,1}^{(1)}c_{2,1}^{(2)}c_{2,1}^{(3)}$ correspond to SD 2, and $c_{3,0}^{(0)}c_{3,1}^{(0)}c_{3,1}^{(2)}$ correspond to SD 3.

According to one or more embodiments, the highest priority of the LC coefficients is the SD-beam index, followed in order by the layer index and the FD-beam index. For example, the LC coefficients are in order of priority of $c_{0,0}^{(0)}c_{0,0}^{(3)}c_{1,0}^{(0)}c_{1,0}^{(1)}c_{1,0}^{(2)}c_{2,1}^{(0)}c_{2,1}^{(1)}c_{2,1}^{(2)}c_{2,1}^{(3)}c_{3,1}^{(0)}c_{3,0}^{(1)}c_{3,1}^{(2)}$ where $c_{0,0}^{(0)}$ has the highest priority, followed in order by $c_{0,0}^{(3)}, c_{1,0}^{(0)}, \ldots c_{3,1}^{(2)}$. In the sequence of the LC coefficients, $c_{0,0}^{(0)}c_{0,0}^{(3)}$ correspond to SD 0, $c_{1,0}^{(0)}c_{1,0}^{(1)}c_{1,0}^{(2)}$ correspond to SD 1, $c_{2,1}^{(0)}c_{2,1}^{(1)}c_{2,1}^{(2)}c_{2,1}^{(3)}$ correspond to SD 2, and $c_{3,1}^{(0)}c_{3,0}^{(1)}c_{3,1}^{(2)}$ correspond to SD 3.

SECOND EXAMPLE

According to one or more embodiments, groups of the LC coefficients may be prioritized by the UE 10. The LC coefficients in i-th CSI report may be divided into two groups. Different priority values for each group may be assigned. For example, the LC coefficients may be divided into coefficient group 1 that includes $c_{0,0}^{(0)}c_{1,0}^{(0)}c_{2,1}^{(0)}c_{3,1}^{(0)}c_{1,0}^{(1)}c_{3,0}^{(1)}$ and coefficient group 2 that includes $c_{2,1}^{(1)}c_{1,0}^{(2)}c_{2,1}^{(2)}c_{3,1}^{(2)}c_{0,0}^{(3)}c_{2,1}^{(3)}$. The LC coefficients in coefficient groups 1 and 2 have different priority values 1 and 2, respectively.

According to one or more embodiments, the LC coefficients may be divided into n groups. n is the number of groups. Different priority values may be assigned for each group. For example, when n is 4, the LC coefficients may be divided into coefficient group 1 that includes $c_{0,0}^{(0)}c_{1,0}^{(0)}c_{2,1}^{(0)}$, coefficient group 2 that includes $c_{3,1}^{(0)}c_{1,0}^{(1)}c_{3,0}^{(1)}$, coefficient group 3 that includes $c_{2,1}^{(1)}c_{1,0}^{(2)}c_{2,1}^{(2)}$, and coefficient group 4 that includes $c_{3,1}^{(2)}c_{0,0}^{(3)}c_{2,1}^{(3)}$. The LC coefficients in coefficient groups 1, 2, 3, and 4 have different priority values 1, 2, 3, and 4, respectively. The number of groups "n" may be configured with the UE 10 using higher layer signaling (e.g., Radio Resource Control (RRC) signaling) from the BS 20. As another example, the number of groups "n" may be configured with the UE 10 using Downlink Control Information (DCI) indicated by x-bit(s) DCI field(s) (reusing existing field(s) or using new field(s)). As another example, the number of groups "n" may be defined in the specification so that the UE 10 recognizes "n" in advance.

According to one or more embodiments, the LC coefficients may be ordered based on a prioritization criteria indicated in the above First Example. The prioritization criteria may be defined in the specification. The prioritization criteria need to make sure sustained LC coefficients after CSI omission are distributed across all layers.

When the LC coefficients are ordered, the highest priority of the LC coefficients is the FD-beam index, followed in order by the SD-beam index and the layer index. For example, In the original order, the LC coefficients are in order of priority of $c_{0,0}^{(0)}c_{1,0}^{(0)}c_{2,1}^{(0)}c_{3,1}^{(0)}c_{1,0}^{(1)}c_{3,0}^{(1)}c_{2,1}^{(1)}c_{1,0}^{(2)}c_{2,1}^{(2)}c_{2,1}^{(2)}c_{0,0}^{(3)}c_{2,1}^{(3)}$. After re-ordering, the LC coefficients are in order of priority of $c_{0,0}^{(0)}c_{0,0}^{(3)}c_{1,0}^{(0)}c_{1,0}^{(1)}c_{1,0}^{(2)}c_{3,0}^{(1)}c_{2,1}^{(0)}c_{2,1}^{(1)}c_{2,1}^{(2)}c_{2,1}^{(3)}c_{3,1}^{(0)}c_{3,1}^{(2)}$.

It is possible to consider all prioritization criteria of First Example to order the LC coefficients. In one or more embodiments, the prioritization procedure considered for LC coefficient ordering may be defined in the specification and the UE 10 and the BS 20 may recognize and implement the prioritization procedure based on the specification.

In one or more embodiments, the ordered LC coefficients may be divided into different sizes of groups.

According to one or more embodiments, the ordered LC coefficients may be divided into two groups and different priority values may be assigned to different groups. For example, ordered LC coefficient group 1 includes $c_{0,0}^{(0)}c_{0,0}^{(3)}c_{1,0}^{(0)}c_{1,0}^{(1)}c_{1,0}^{(2)}c_{3,0}^{(1)}$ and ordered LC coefficient group 2 includes $c_{2,1}^{(0)}c_{2,1}^{(1)}c_{2,1}^{(2)}c_{2,1}^{(3)}c_{3,1}^{(0)}c_{3,1}^{(2)}$. The ordered LC coefficient groups 1 and 2 have different priority values 1 and 2, respectively.

According to one or more embodiments, the ordered LC coefficients may be divided into n groups and different priority values may be assigned to different groups. For example, the number of groups "n" is 4, ordered LC coefficient group 1 includes $c_{0,0}^{(0)}c_{0,0}^{(3)}c_{1,0}^{(0)}$, ordered LC coefficient group 2 includes $c_{1,0}^{(1)}c_{1,0}^{(2)}c_{3,0}^{(1)}$, ordered LC coefficient group 3 includes $c_{2,1}^{(0)}c_{2,1}^{(1)}c_{2,1}^{(2)}$, and ordered LC coefficient group 4 includes $c_{2,1}^{(3)}c_{3,1}^{(0)}c_{3,1}^{(2)}$. The ordered LC coefficient groups 1, 2, 3, and 4 have different priority values 1, 2, 3, and 4, respectively.

In one or more embodiments, the number of groups "n" may be configured with the UE 10 using higher layer signaling from the BS 20. As another example, the number of groups "n" may be configured with the UE 10 using DCI indicated by x-bit(s) DCI field(s) (reusing existing field(s) or using new field(s)). As another example, the number of groups "n" may be defined in the specification so that the UE 10 recognizes "n" in advance.

THIRD EXAMPLE

According to one or more embodiments, priority reporting levels for Rel. 16 Type II CSI may be applied.

Figure 4:
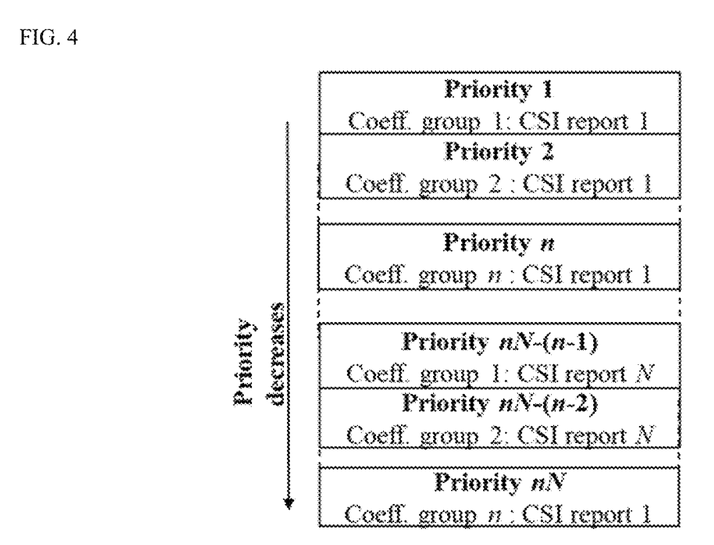
FIG. 4 shows an example of priority reporting levels for Part 2 CSI according to one or more embodiments.

According to one or more embodiments, consecutive priority values may be assigned to LC coefficient groups belong to the same CSI report as shown in See FIG. 4. FIG. 4 shows priority reporting levels for Part 2 CSI according to one or more embodiments. In FIG. 4, N CSI reports each with n groups are considered. LC coefficient groups can be generated using methods of Second Example.

In the CSI report prioritization method according to one or more embodiments, CSI reports may be associated with a priority value $\text{Pri}_{iCSI}(y, k, c, s) = 2 \cdot N_{cells} \cdot M_s \cdot y^\circ N_{cells} \cdot M_s \cdot k + M_s \cdot c + s$ where y=0 for aperiodic CSI reports to be carried on PUSCH, y=1 for semi-persistent CSI reports to be carried on PUSCH, y=2 for semi-persistent CSI reports to be carried on PUCCH and y=3 for periodic CSI reports to be carried on PUCCH;

k=0 for CSI reports carrying L1-RSRP and k=1 for CSI reports not carrying L1-RSRP;

c is the serving cell index and Ncells is the value of the higher layer parameter maxNrofServingCells; and s is the reportConfigID and $M_s$ is the value of the higher layer parameter maxNrofCSI-ReportConfigurations.

Figure 5:
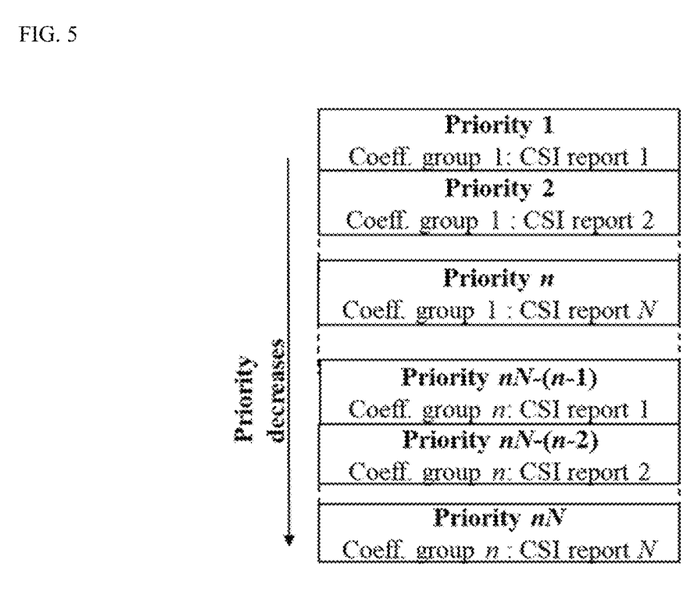
FIG. 5 shows an example of priority reporting levels for Part 2 CSI according to one or more embodiments.

According to one or more embodiments, consecutive priority values may be assigned to the same coefficient group of different CSI reports as shown FIG. 5. FIG. 5 shows an example of priority reporting levels for the Part 2 CSI according to one or more embodiments. N CSI reports each with n groups are considered. LC coefficient groups can be generated using methods of Second Example.

In the CSI report prioritization method according to one or more embodiments, CSI reports may be associated with a priority value $Pri_{iCSI}(y, k, c, s) = 2 \cdot N_{cells} \cdot M_s \cdot y + N_{cells} \cdot M_s \cdot k + M_s \cdot c + s$. The parameters in this formula are the same as above. In this example, n may be greater than or equal to 2 as indicated in Second Example.

FOURTH EXAMPLE

According to one or more embodiments, CSI Omission Procedure for Rel. 16 Type II CSI may be applied. If the UE 10 transmits CSI in a PUCCH and has to multiplex HARQ-ACK, SR and CSI or the UE 10 transmits CSI in a PUSCH and has to multiplex HARQ-ACK, and CSI, and if including entire UCI for assigned transmission resources and code rate is not feasible, CSI omission may be performed as follows:
- the UE 10 may drop LC coefficients one at a time (based on the priority of the LC coefficients) until HARQ-ACK, SR and CSI fit to assigned PUCCH/PUSCH resources and code rate. The LC coefficient prioritization method of First Example may be used;
- the UE10 may drop group of NZCs at a time (based on the priority of the LC coefficients) until HARQ-ACK, SR and CSI fit to assigned PUCCH/PUSCH resources and code rate. Groups of LC coefficient prioritization of Second and Third Examples; and
- the UE10 may drop CSI part 2 entirely of one or more CSI reports in order of CSI priority until HARQ-ACK, SR and CSI fit to assigned PUCCH/PUSCH resources and code rate.

In Fourth Example, the CSI reports may be associated with the priority value $Pri_{iCSI}(y, k, c, s) = 2 \cdot N_{cells} \cdot M_s \cdot y + N_{cells} \cdot M_s \cdot k + M_s \cdot c + s$.

Section 9.2.5.2 of TS 38.213 describes "[i]n the following, a Part 1 CSI report refers either to a CSI report with only wideband CSI or to a Part 1 of a CSI report with wideband CSI and sub-band CSI." In one or more embodiments, definition of CSI part 1 in Section 9.2.5.2 of TS 38.213 may be reworded as follows for better clarity and align with TS 38.214:

"In the following, a Part 1 of a CSI report,
of Type I CSI feedback contains, RI (if reported), CRI (if reported), CQI for the first codeword; and
of Type II CSI feedback contains RI, CQI, and an indication of the number of non-zero wideband amplitude coefficients per layer for the Type II CSI (see subclause 5.2.2 of TS 38.214) or number of non-zero coefficients for the Type II CSI in Rel.16.

Further, Part 2 of Type I CSI feedback contains PMI and the CQI for the second codeword when RI>4 while that of Type II CSI contains PMI of WB and/or SB for Rel. 15 and bitmaps, LC coefficients for Rel. 16.

FIFTH EXAMPLE

Figure 6:
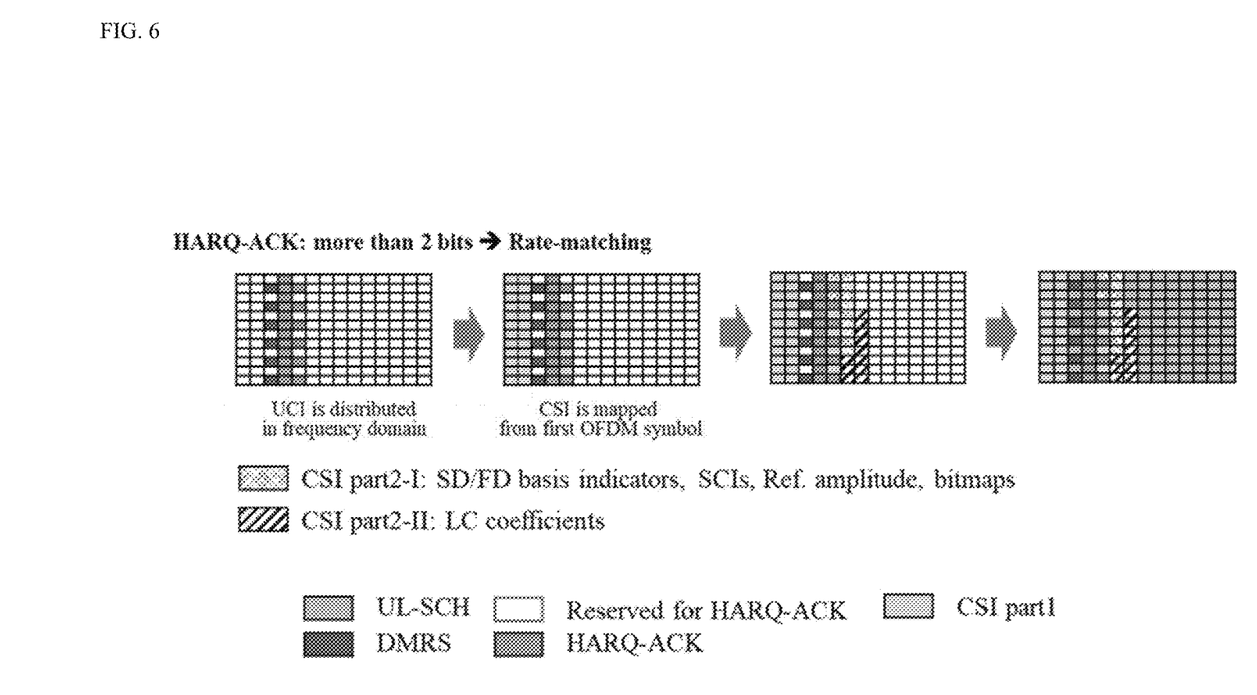
FIG. 6 shows a PUSCH resource multiplexing method CSI according to one or more embodiments.

According to one or more embodiments, PUSCH Resource Multiplexing may be applied. For example, CSI part 2 may be split into two sub-parts and resources may be assigned to tow sub-parts separately as shown in FIG. 6. In FIG. 6, CSI part 2 is again split into CSI part2-I and CSI part2-II, only for resource mapping purposes. The LC coefficients are mapped to CSI part2-II, since this part may be omitted during rate matching, if required. The two sub-parts in CSI part2 may be separately encoded.

Alternative/Additional Embodiments $c_{l_1,m_1}^{(\lambda_1)}$ and $c_{l_2,m_2}^{(\lambda_2)}$ (where $\lambda_i$, $l_i$, $m_i$ are the layer index, SD beam index and FD beam index respectively) are such that $Prio(\lambda_2,l_2,m_2) < Prio(\lambda_1,l_1,m_1)$, then an LC coefficient/bit of bitmap $c_{k_2,m_2}^{(\lambda_2)}$ has a higher priority over $c_{l_1,m_1}^{(\lambda_1)}$.

Configuration of Base Station

Figure 7:
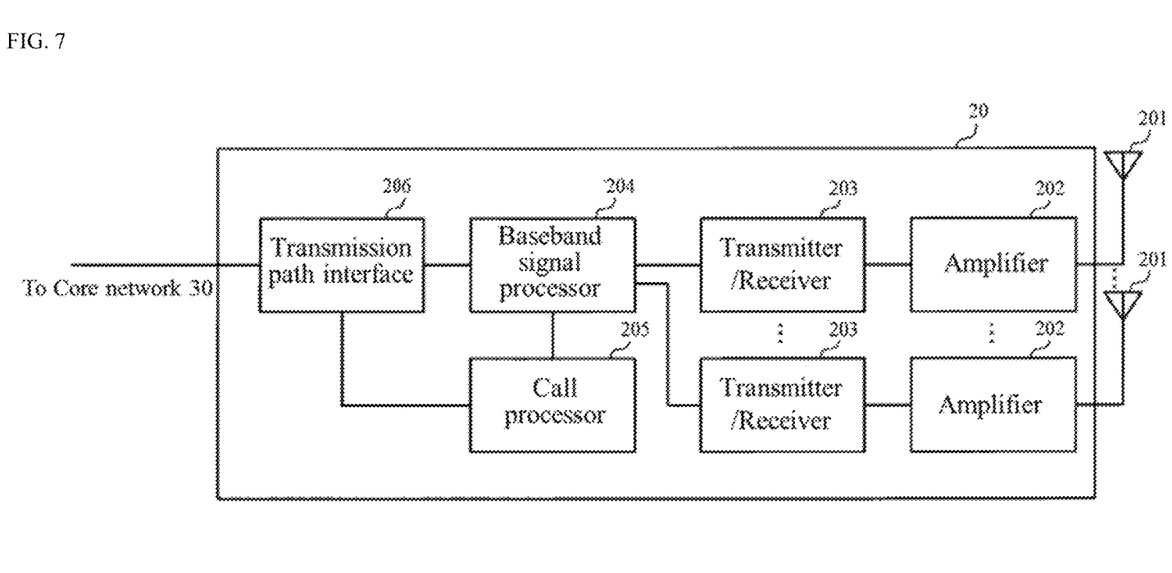
FIG. 7 shows a schematic configuration of a BS according to one or more embodiments.

The BS 20 according to one or more embodiments of the present invention will be described below with reference to FIG. 7. FIG. 7 is a diagram illustrating a schematic configuration of the BS 20 according to one or more embodiments of the present invention. The BS 20 may include a plurality of antennas 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antenna 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

Configuration of User Equipment

Figure 8:
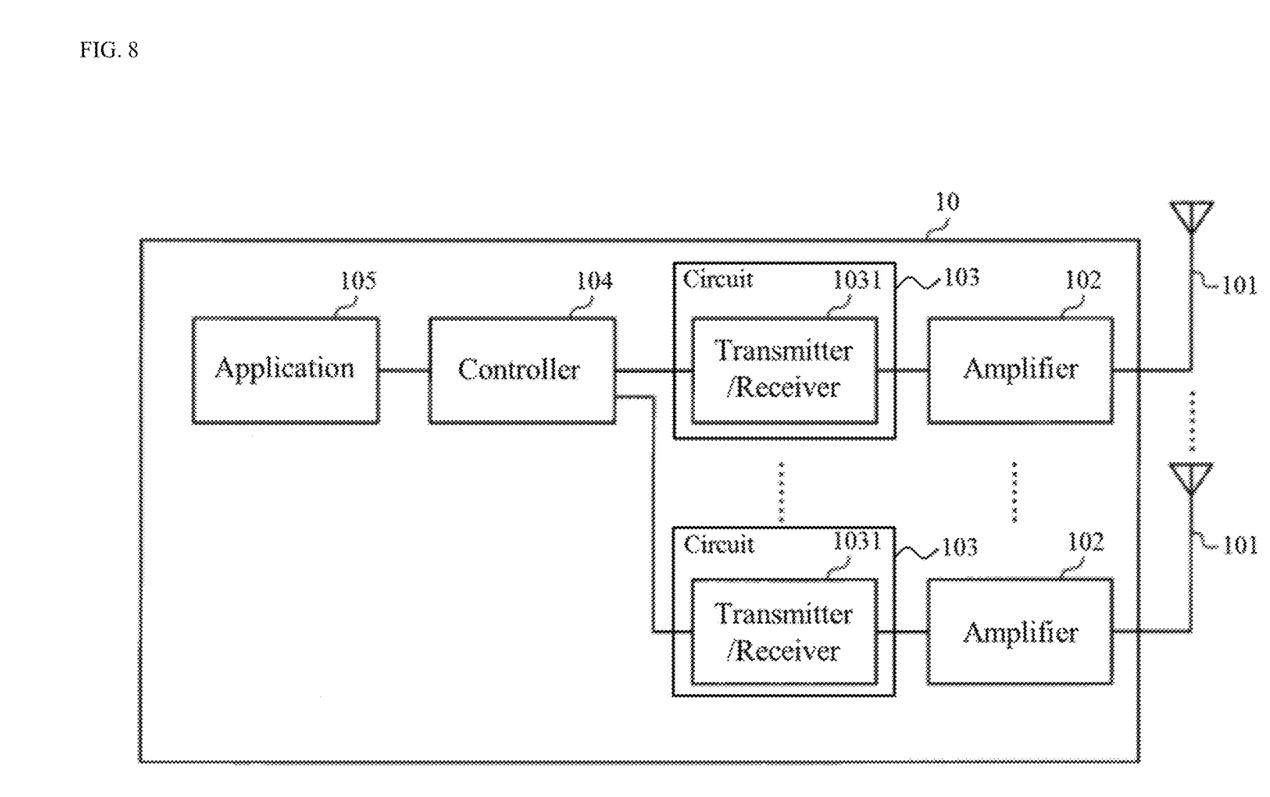
FIG. 8 shows a schematic configuration of a UE according to one or more embodiments.

The UE 10 according to one or more embodiments of the present invention will be described below with reference to FIG. 8. FIG. 8 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments may exhibit one or more of the following advantages. In one or more embodiments, overhead may be reduced in CSI feedback schemes. In particular, in one or more embodiments, Type II CSI feedback overheard may be reduced.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal in communication with a base station (BS), the terminal comprising:
   a receiver that receives Channel State Information (CSI)-Reference Signals (RSs) from the BS;
   a processor that generates CSI based on the CSI-RSs and performs CSI omission; and
   a transmitter that transmits, to the BS, CSI reports including the CSI where one or more linear combination (LC) coefficients are omitted based on the CSI omission,
   wherein in the CSI omission, the processor prioritizes LC coefficients based on a predetermined priority rule,
   the processor determines the omitted one or more LC coefficients based on the prioritized LC coefficients,
   the LC coefficients are further grouped into one or more LC coefficient groups and the processor prioritizes the one or more LC coefficient groups based on a predetermined group priority rule,
   the processor determines the omitted one or more LC coefficients based on the prioritized one or more groups of LC coefficients, and
   the processor determines the number of the prioritized one or more groups by using higher layer signaling.

2. The terminal according to claim 1, wherein the processor further includes a bitmap in the CSI, and wherein the processor determines the bitmap based on the predetermined priority rule.

3. The terminal according to claim 1, wherein the predetermined priority rule defines that a highest priority of the LC coefficients is a Frequency Domain (FD)-beam index, followed in order by a Spatial Domain (SD)-beam index and a layer index.

4. The terminal according to claim 1, wherein if priority levels of two LC coefficients/bits of bitmap $c_{l_1,m_1}^{(\lambda_1)}$ and $c_{l_2,m_2}^{(\lambda_2)}$ (where $\lambda_i$, $l_i$, $m_i$ are the layer index, SD beam index and FD beam index respectively) are such that $Prio(\lambda_2,l_2,m_2) < Prio(\lambda_1,l_1,m_1)$, then an LC coefficient/bit of bitmap $c_{l_2,m_2}^{(\lambda_2)}$ has a higher priority over $c_{l_1,m_1}^{(\lambda_1)}$.

5. The terminal according to claim 4, wherein the one or more LC coefficient groups are generated by the processor from an ordered LC coefficient sequence based on a prioritization criteria.

6. The terminal according to claim 1, wherein the processor applies PUSCH resource multiplexing to the CSI.

7. The terminal according to claim 1, wherein processor splits the CSI into two parts for PUSCH resource mapping.

8. A method for a terminal that is in communication with a base station (BS), the method comprising:
   receiving Channel State Information (CSI)-Reference Signals (RSs) from the BS;
   generating CSI based on the CSI-RSs and performing CSI omission; and
   transmitting, to the BS, CSI reports including the CSI where one or more linear combination (LC) coefficients are omitted based on the CSI omission,
   wherein in the CSI omission, the terminal prioritizes LC coefficients based on a predetermined priority rule,
   wherein the terminal determines the omitted one or more LC coefficients based on the prioritized LC coefficients,
   the LC coefficients are further grouped into one or more LC coefficient groups and the terminal prioritizes the one or more LC coefficient groups based on a predetermined group priority rule,
   the terminal determines the omitted one or more LC coefficients based on the prioritized one or more groups of LC coefficients, and
   the terminal determines the number of the prioritized one or more groups by using higher layer signaling.

9. A radio communication system comprising:
   a base station (BS); and
   a terminal comprising:
      a receiver that receives Channel State Information (CSI)-Reference Signals (RSs) from the BS;
      a processor that generates CSI based on the CSI-RSs and performs CSI omission; and
      a transmitter that transmits, to the BS, CSI reports including the CSI where one or more linear combination (LC) coefficients are omitted based on the CSI omission,
      wherein in the CSI omission, the processor prioritizes LC coefficients based on a predetermined priority rule, wherein the processor determines the omitted one or more LC coefficients based on the prioritized LC coefficients, the LC coefficients are further grouped into one or more LC coefficient groups and the processor prioritizes the one or more LC coefficient groups based on a predetermined group priority rule, the processor determines the omitted one or more LC coefficients based on the prioritized one or more groups of LC coefficients, and the processor determines the number of the prioritized one or more groups by using higher layer signaling.

\* \* \* \* \*